United States Patent
Godo

(10) Patent No.: US 7,431,480 B2
(45) Date of Patent: Oct. 7, 2008

(54) OPTICAL ELEMENT, COMPOUND OPTICAL ELEMENT, AND ILLUMINATING APPARATUS

(75) Inventor: Hirokazu Godo, Tokyo (JP)

(73) Assignee: Olympus Corporation, Tokyo (JP)

( * ) Notice: Subject to any disclaimer, the term of this patent is extended or adjusted under 35 U.S.C. 154(b) by 232 days.

(21) Appl. No.: 11/015,626

(22) Filed: Dec. 17, 2004

(65) Prior Publication Data

US 2005/0201118 A1     Sep. 15, 2005

(30) Foreign Application Priority Data

Mar. 12, 2004 (JP) ............... 2004-070789

(51) Int. Cl.
*F21V 3/00* (2006.01)
(52) U.S. Cl. ............ 362/311; 362/800
(58) Field of Classification Search ........ 362/311
See application file for complete search history.

(56) References Cited

U.S. PATENT DOCUMENTS

| | | | | |
|---|---|---|---|---|
| 2,362,176 A | * | 11/1944 | Swanson | 313/110 |
| 4,698,730 A | * | 10/1987 | Sakai et al. | 362/311 |
| 5,898,267 A | * | 4/1999 | McDermott | 362/311 |
| 6,961,190 B1 | * | 11/2005 | Tamaoki et al. | 359/708 |

FOREIGN PATENT DOCUMENTS

| | | |
|---|---|---|
| JP | H04-18406 | 3/1992 |
| JP | 04-138438 | 5/1992 |
| JP | 10-115853 | 5/1998 |
| JP | 11-146142 | 5/1999 |
| JP | 2001-125197 | 5/2001 |
| JP | 2002-333656 | 11/2002 |

* cited by examiner

*Primary Examiner*—Ali Alavi
*Assistant Examiner*—William J Carter
(74) *Attorney, Agent, or Firm*—Volpe and Koenig P.C.

(57) ABSTRACT

An optical element of the present invention includes: a primary surface-1 whereon diffuse illuminating light radiated by a light source device is incident; a primary surface-2 formed in a concave cross-sectional shape when viewed from the primary surface-1, which reflects only illuminating light incident from the primary surface-1; a primary surface-3 formed in a convex cross-sectional shape when viewed from the primary surface-1, which reflects only diffuse illuminating light radiated by the light source device; and a primary surface-4 which radiates illuminating light incident from the primary surface-1 and illuminating light reflected by the primary surface-2. The primary surfaces-1 through -4 are located at positions such that the light beams reflected by the primary surface-2 and the light beams reflected by the primary surface-3 are substantially parallel.

28 Claims, 7 Drawing Sheets

OPTICAL ELEMENT, COMPOUND OPTICAL ELEMENT, AND ILLUMINATING APPARATUS

BACKGROUND OF THE INVENTION

Priority is claimed on Japanese Patent Application No. 2004-70789 filed on Mar. 12, 2004, the contents of which are incorporated herein by reference.

1. Field of the Invention

The present invention relates to an optical element, a compound optical element, and an illuminating apparatus which forms diffuse illuminating light radiated from a light source into substantially parallel light.

2. Description of Related Art

A large number of light-condensing illuminating apparatuses such as image projection apparatuses and strobe lights employing reflective mirrors and lenses and the like have been proposed for efficient condensing of diffuse light from LEDs (Light Emitting Diodes), mercury lamps, filaments and the like.

Illuminating apparatuses employing primary and auxiliary reflecting mirrors for improved efficiency in condensing reflected light have been proposed (see, for example, Japanese Examined Patent Application, Second Publication No. H04-18406, and Japanese Unexamined Patent Application, First Publication No. 2001-125197). In these illuminating apparatuses, a plurality of reflecting mirrors are positioned in the same orientation in relation to the light source, and light at angles not previously employed is effectively employed.

Furthermore, illuminating apparatuses in which condensing efficiency is improved with lenses and prisms have also been proposed (see for example, Japanese Unexamined Patent Application, First Publication No. 2002-333656, and Japanese Unexamined Patent Application, First Publication No. H04-138438). These illuminating apparatuses form light in which the angle of light from the light source is almost perpendicular to the radiating surface, into a parallel light with a lens, and reflect light having a wider angle using total reflection of a prism, to radiate it from the radiating surface.

Moreover, illuminating apparatuses in which the condensing efficiency is improved with prisms only, have also been proposed (see for example, Japanese Unexamined Patent Application, First Publication No. H10-115853, and Japanese Unexamined Patent Application, First Publication No. H11-146142). These illuminating apparatuses guide light by total reflection within the prisms, and radiate light from the radiating surface.

SUMMARY OF THE INVENTION

An optical element according to the present invention is positioned in relation to a light source device, to convert the diffuse illumination light radiated by the light source device into substantially parallel light, including: a primary surface-1 whereon diffuse illuminating light radiated by the light source device is incident; a primary surface-2 formed in a concave cross-sectional shape when viewed from the primary surface-1, which reflects only illuminating light incident from the primary surface-1; a primary surface-3 formed in a convex cross-sectional shape when viewed from the primary surface-1, which reflects only diffuse illuminating light radiated by the light source device; and a primary surface-4 which radiates illuminating light incident from the primary surface-1 and illuminating light reflected by the primary surface-2. The primary surfaces-1 through -4 are located at positions such that the light beams reflected by the primary surface-2 and the light beams reflected by the primary surface-3 are substantially parallel.

In the optical element, the primary surface-3 may include a reflective coating.

A compound optical element according to the present invention includes the optical element which is the primary optical element, and a secondary optical element positioned adjacent to the primary surface-3 of the primary optical element. The secondary optical element includes at least: a secondary surface-1 whereon diffuse illuminating light radiated by the light source device is incident; a secondary surface-2 formed in a concave cross-sectional shape when viewed from the secondary surface-1, which reflects only illuminating light incident from the secondary surface-1; a secondary surface-3 formed in a convex cross-sectional shape when viewed from the secondary surface-1, which reflects only diffuse illuminating light radiated by the light source device; and a secondary surface-4 which radiates illuminating light incident from the secondary surface-1 and illuminating light reflected by the secondary surface-2. The secondary surfaces-1 through -4 are located at positions such that the light beams reflected by the secondary surface-2 and the light beams reflected by the secondary surface-3 are substantially parallel.

In the compound optical element, the secondary surface-3 may includes a reflective coating.

A first illuminating apparatus according to the present invention includes a light source device which radiates diffuse illuminating light, and the abovementioned optical element.

In the first illuminating apparatus, the primary surface-2 may be a totally reflective surface which satisfies the total internal reflected condition for illuminating light incident from the primary surface-1.

In the first illuminating apparatus, the primary surface-3 may include a reflective coating which reflects the diffuse illuminating light radiated by the light source device.

In the first illuminating apparatus, the primary surface-2 and the primary surface-3 may be parabolic surfaces.

In this case, the position of a focal point of a parabolic surface forming the primary surface-2, and the position of a focal point of a parabolic surface forming the primary surface-3 may be in substantially the same position.

In this case, the position of the focal points may be located at the approximate center of the light source device.

A second illuminating apparatus according to the present invention includes a light source device which radiates diffuse illuminating light, and the abovementioned compound optical element. The secondary optical element has a refractive index higher than the refractive index of the primary optical element, and is positioned such that the secondary surface-2 and the primary surface-3 are in contact.

In the second illuminating apparatus, the secondary surface-2 may be a totally reflective surface that satisfies the total internal reflected condition for illuminating light incident from the secondary surface-1.

In this case, the primary surfaces-1 through -4, and the secondary surfaces-1 through -4 may be positioned such that the beams of illuminating light reflected by the primary surface-2, and the beams of illuminating light reflected by the secondary surface-2 are substantially parallel.

A third illuminating apparatus according to the present invention includes a light source device which radiates diffuse illuminating light, and the compound optical element. The secondary surface-2 and the primary surface-3 are adjacent via a spatial gap.

In the third illuminating apparatus, the spatial gap may be an air layer; and the secondary surface-2 may be a totally reflective surface that satisfies the total internal reflected condition for illuminating light incident from the secondary surface-1.

In this case, the primary surfaces-1 through -4, and the secondary surfaces-1 through -4 may be positioned such that the beams of illuminating light reflected by the primary surface-2, and the beams of illuminating light reflected by the secondary surface-2 are substantially parallel.

In the second and third illuminating apparatuses, a reflective coating which reflects the diffuse illuminating light radiated by the light source device may be provided on the secondary surface-3.

In any one of the first to third illuminating apparatuses, the light source device may include a light emitting part, and a primary transparent element which covers the light emitting part. In addition, a secondary transparent element may be provided in a gap between the primary surface-1 and the primary transparent element.

In this case, a refractive index of the secondary transparent element may be substantially equal to a refractive index of the abovementioned optical element.

In this case, the secondary transparent element may be a transparent adhesive for use with optical devices. In addition, between the abovementioned optical element and the light source device may be bonded with the transparent adhesive for use with optical devices.

A fourth illuminating apparatus of the present invention includes a light source device which radiates diffuse illuminating light, and an optical element which converts diffuse illuminating light radiated by the light source device into substantially parallel light. The optical element includes at least: a primary surface whereon the diffuse illuminating light radiated by the light source device is incident; a ternary surface formed in a convex cross-sectional shape when viewed from the primary surface, which reflects the diffuse illuminating light radiated by the light source device by Fresnel reflection; a secondary surface formed in a concave cross-sectional shape when viewed from the primary surface, which reflects illuminating light incident from the primary surface and illuminating light transmitted without Fresnel reflection by the ternary surface; and a quaternary surface which radiates illuminating light incident from the primary surface and illuminating light reflected by the secondary surface. The primary through quaternary surfaces are located at positions such that the light beams reflected by the secondary surface and the light beams reflected by the ternary surface are substantially parallel, or at positions such that they are inclined towards the light source device from an substantially parallel direction.

A fifth illuminating apparatus of the present invention includes: a light source device having a light emitting part and a transparent element which covers the light emitting part, which radiates diffuse illuminating light; the abovementioned optical element; and a lens having a positive power and positioned on the surface of the transparent element not in contact with the optical element.

In the fifth illuminating apparatus, the lens may include a shape having optical characteristics such that the beams of illuminating light passing through the lens are substantially parallel to the beams of illuminating light reflected by the primary surface-2 or the beams of illuminating light reflected by the secondary surface-2.

DETAILED DESCRIPTION OF THE INVENTION

A first embodiment according to the present invention will be explained, with reference to FIGS. 1 to 3.

An illuminating apparatus 1 according to the present embodiment is provided with a light source device 2 which radiates diffused illuminating light, and an optical element 3 positioned in relation to the light source device 2 which converts the diffuse illuminating light radiated by the light source device 2 into substantially parallel light.

Figure 1:
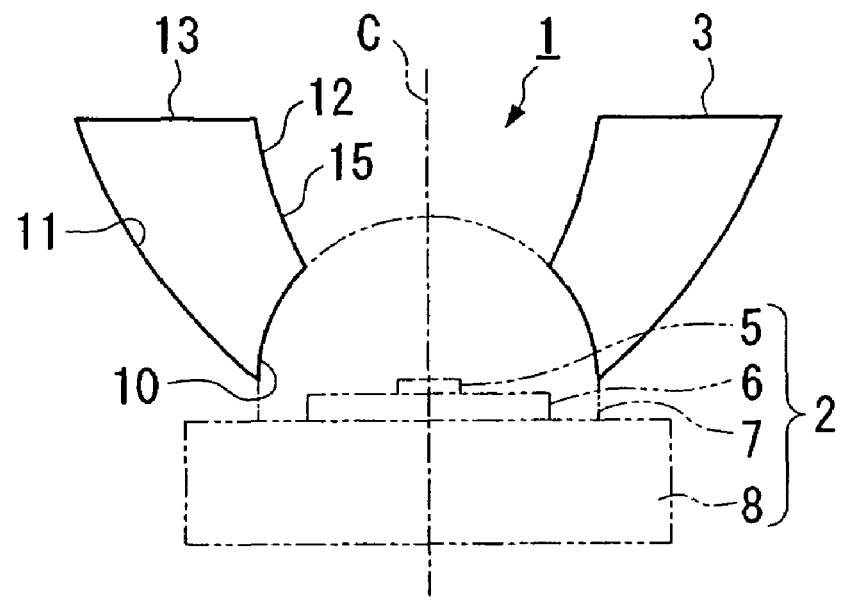
FIG. 1 is a side view of an illuminating apparatus and an optical element of a first embodiment of the present invention.
Figure 2:
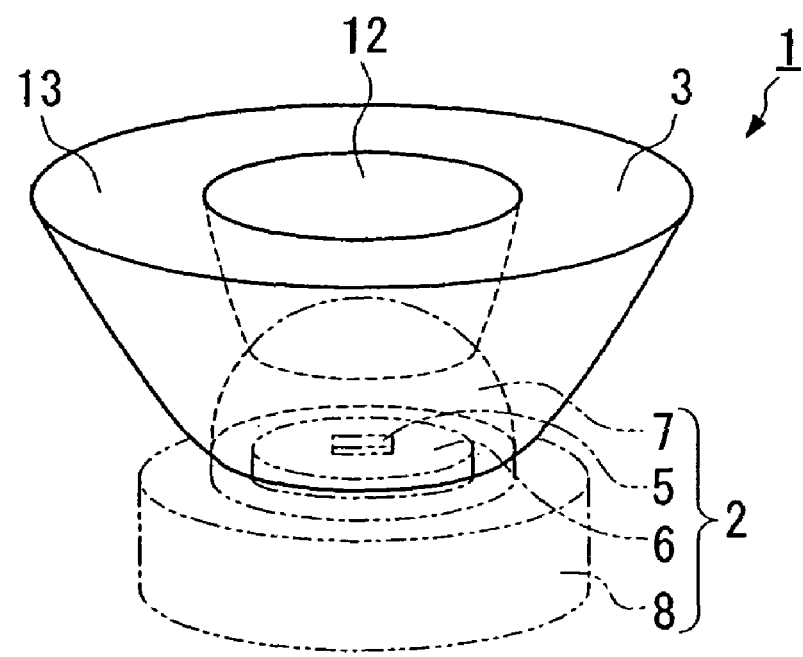
FIG. 2 is a perspective view of the same illuminating apparatus and optical element.
Figure 3:
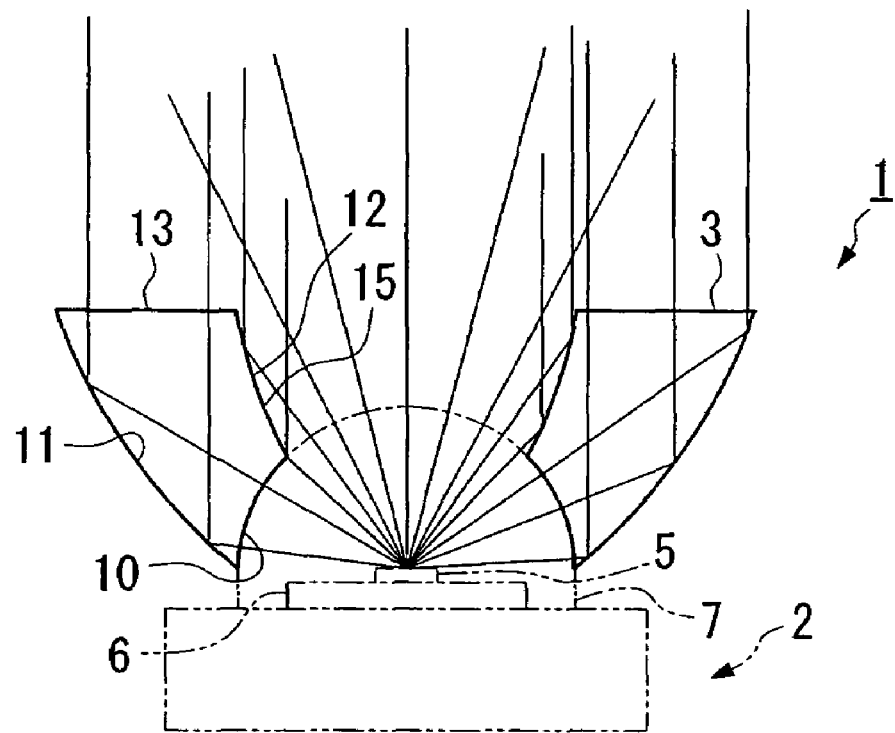
FIG. 3 is an optical path diagram of an illuminating light in the same illuminating apparatus.

As shown in FIGS. 1 and 2, the light source device 2 is provided with a light emitting part 5 formed from a chip type LED (Light Emitting Diode) or the like, a base 6 which supports the light emitting part 5, a molded lens (transparent element) 7 which covers the light emitting part 5 and the base 6 and is formed in a dome-shape, and a base 8 which supports the components.

The optical element 3 is made of a transparent material such as methacrylic resin (PMMA), polycarbonate resin, or glass. The optical element 3 is provided with: a primary surface-1 10 formed such that it is able to be fitted in close contact to the molded lens 7 and whereon the diffuse illuminating light radiated by the light source device 2 is incident; a primary surface-2 11 formed so as to extend from the outer peripheral edge of the primary surface-1 10 and formed in a concave cross-sectional shape when viewed from the primary surface-1 10, which reflects only the illuminating light incident from the primary surface-1 10; a primary surface-3 12 formed extended from the inner peripheral edge of the primary surface-1 10, and formed in a convex cross-sectional shape when viewed from the primary surface-1 10, which reflects only the illuminating light radiated by the light source device; and a primary surface-4 13 connected to the primary surface-2 11 and the primary surface-3 12, and which radiates illuminating light incident from the primary surface-1 10 and illuminating light reflected by the primary surface-2 11. The primary surfaces-1 10, -2 11, -3 12, and -4 13 are located at positions such that the light beams reflected by the primary surface-2 11 and the light beams reflected by the primary surface-3 12 are substantially parallel.

The primary surface-2 11 is a totally reflective surface that satisfies the total internal reflected condition for the illuminating light incident from the primary surface-1 10.

A reflective coating 15 which reflects diffuse illuminating light radiated by the light source device 2 is applied to the primary surface-3 12.

The primary surface-2 11 and the primary surface-3 12 are parabolic surfaces. The positions of the focal points of the parabolic surface forming the primary surface-2 11 and the parabolic surface forming the primary surface-3 are substantially the same as for the light emitting part 5 being the approximate center position of the light source device 2.

The optical element 3 is rotationally symmetrical around the center axis C, and the central part is hollowed out to form an approximate bowl-shape. That is to say, the optical element 3 is formed in an approximate bowl-shape surrounded by; the bowl-base surface (equivalent to primary surface-1 10) in close contact with the outer peripheral surface of the molded lens 7, the bowl-shaped outer peripheral side surface (equivalent to primary surface-2 11), the bowl-shaped inner peripheral side surface (equivalent to primary surface-3 12), and the bowl top surface (equivalent to primary surface-4 13).

Next, use, actions, and effects, of the optical element 3 and illuminating apparatus 1 according to the present embodiment will be explained, with reference to FIG. 3.

With the perpendicular direction of the base 6 as the direction of illumination, when the diffuse illuminating light from the light emitting part 5 is emitted, the component of the diffuse illuminating light having a large angle of inclination from the direction of illumination is incident on the primary surface-1 10, and reaches the primary surface-2 11. Since the light emitting part 5 is a point light source, and the primary surface-2 11 is a parabolic surface, the component is then reflected towards the primary surface-4 13. At this time, since the primary surface-2 11 is a totally reflective surface, the light is reflected without attenuation. Hence the illuminating light incident on the primary surface-1 10 is adjusted to be substantially parallel to the direction of illumination, and is radiated from the primary surface-4 13.

Of the illuminating light not incident on the primary surface-1 10, the illuminating light reaching the primary surface-3 12 is reflected by the primary surface-3 12. At this time, since the primary surface-3 12 is a parabolic surface, the reflected light proceeds in a direction substantially parallel to the direction of illumination.

Since the illuminating light which is also not reflected by primary surface-3 12 has a component substantially parallel to the original direction of illumination, it proceeds in the direction of illumination without change.

According to the optical element 3 and the illuminating apparatus 1 of the present embodiment, the diffuse illuminating light can be arranged substantially parallel towards the desired direction of illumination.

Moreover, the attenuation when the illuminating light transmitted through the primary surface-1 10 is reflected by the primary surface-2 11, can be suppressed.

Furthermore, since the diffuse illuminating light is reflected by the parabolic surface, it can be readily changed to substantially parallel light. In this case, by matching the position of the focal point, the condensing efficiency can be further improved.

Moreover, since light radiated from the light emitting part 5 in the direction of illumination and within the desired angle is not passed through the optical element, it is not affected by Fresnel loss and dispersion.

Furthermore, a plurality of reflective surfaces can be implemented in a single element, and parallel light can be radiated with little loss in an optical element 3 of simple configuration.

Figure 4:
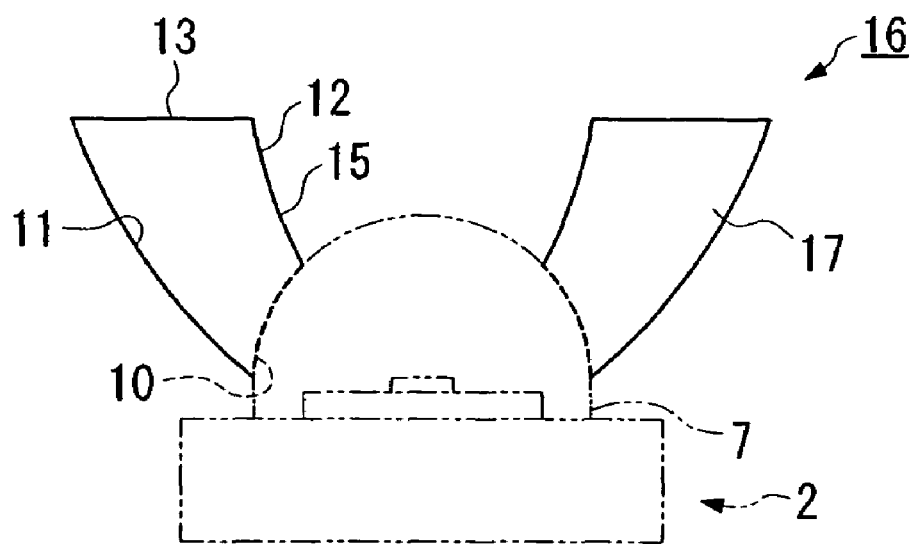
FIG. 4 is a side view of an illuminating apparatus and an optical element of a second embodiment of the present invention.

Next, a second embodiment of the present invention will be explained, with reference to FIG. 4.

The same reference symbols are employed for components the same as in the first embodiment, and description is omitted.

The present embodiment differs from the first embodiment in that the primary surface-1 10 of the optical element 17 of the illuminating apparatus 16 according to the present embodiment, and the molded lens 7 of the light source device 2, are bonded together with a transparent adhesive for use with optical devices.

The transparent adhesive for use with optical devices has a refractive index substantially the same as the refractive index of the optical element 17 and the molded lens 7.

By operating the illuminating apparatus 16 with a similar method as for the first embodiment, similar actions and effects can be demonstrated. Moreover, by filling the gap between the primary surface-1 10 and the molded lens with transparent adhesive for use with optical devices, it is possible to reduce the difference in refractive index across the gap, and to reduce Fresnel loss. Furthermore, by fixing in place with adhesive, the optical element 17 can be held directly on the light source device 2.

Next, a third embodiment of the present invention will be explained, with reference to FIGS. 5 to 7.

The same reference symbols are employed for components the same as in the first embodiment, and description is omitted.

The present embodiment differs from the first embodiment in that an illuminating apparatus 18 is provided with a compound optical element 20.

Figure 5:
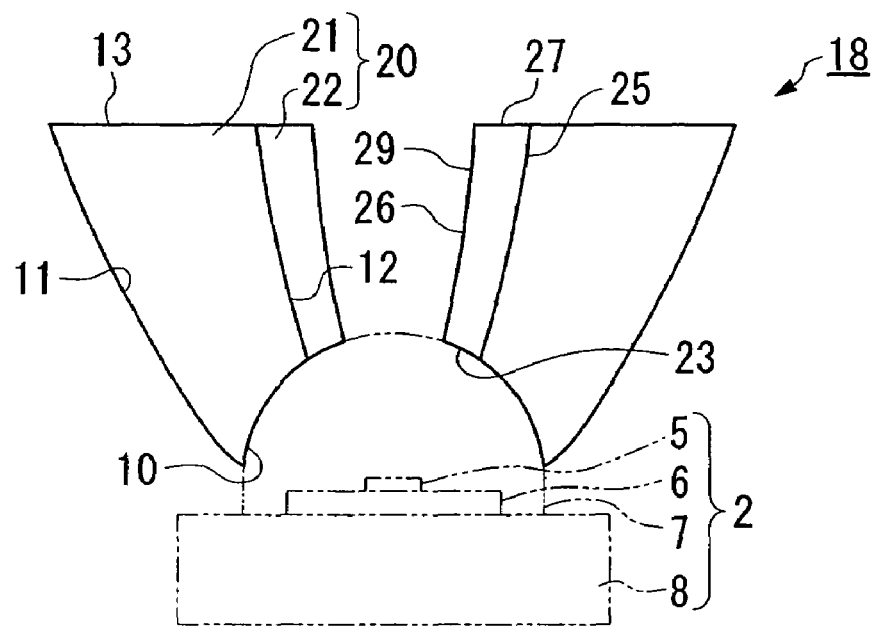
FIG. 5 is a side view of an illuminating apparatus and an optical element of a third embodiment of the present invention.
Figure 6:
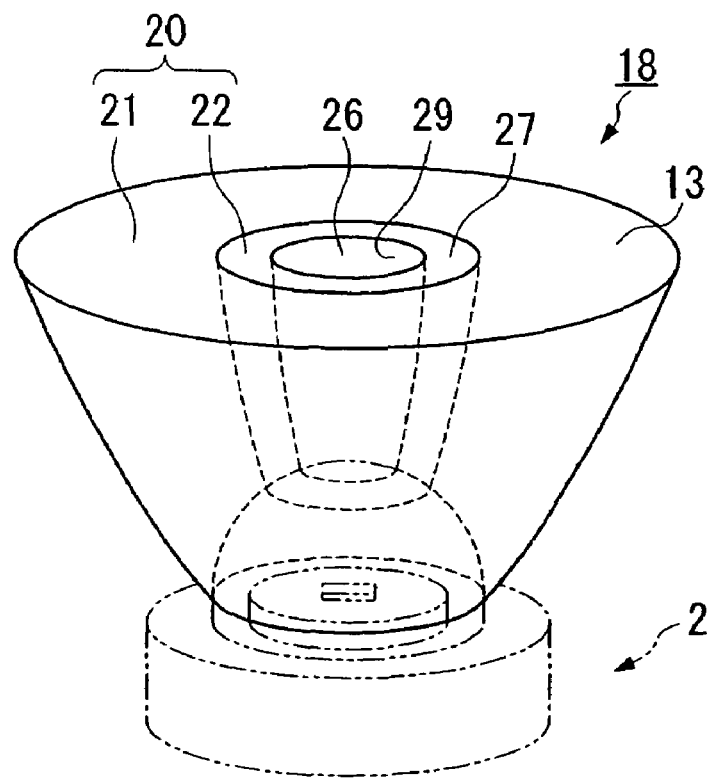
FIG. 6 is a perspective view of the same illuminating apparatus and optical element.
Figure 7:
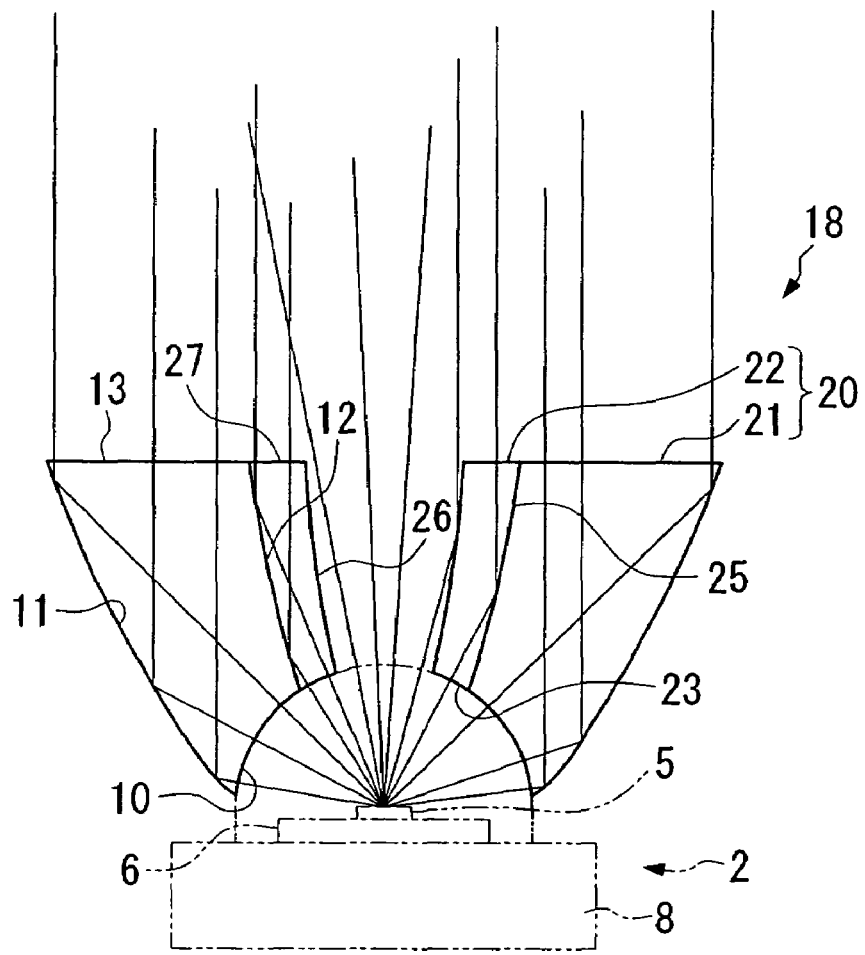
FIG. 7 is an optical path diagram of the illuminating light for the same illuminating apparatus.

As shown in FIGS. 5 and 6, the compound optical element 20 is provided with a primary optical element 21 having the same configuration as the optical element 3 according to the first embodiment, and a secondary optical element 22 positioned in contact with the primary surface-3 12 of the primary optical element 21, and having a refractive index higher than the primary optical element 21.

The secondary optical element 22 is also provided with a similar configuration to the primary optical element 21. That is to say, the secondary optical element 22 is provided with: a secondary surface-1 23 formed such that it is able to be fitted in close contact with the molded lens 7 and mounted thereon, and whereon the diffuse illuminating light radiated by the light source device 2 is incident; a secondary surface-2 25 which reflects only illuminating light incident from the secondary surface-1 23, formed extended from the outer peripheral edge of the secondary surface-1 23 so as to form a concave cross-sectional shape when viewed from the secondary surface-1 23, satisfying the total internal reflected condition, and forming a common surface with the primary surface-3 12; a secondary surface-3 26 which reflects only diffuse illuminating light radiated by the light source device 2, formed extended from the inner peripheral edge of the secondary surface-1 23 so as to form a convex cross-sectional shape when viewed from the secondary surface-1 23; and a secondary surface-4 27 connected to the secondary surface-2 25 and the secondary surface-3 26 and which radiates illuminating light incident from the secondary surface-1 23 and illuminating light reflected by the secondary surface-2 25.

The secondary surface-3 26 may be provided with a reflective coating 29 which reflects the diffuse illuminating light radiated by the light source device 2.

The secondary surface-1 23, the secondary surface-2 25, the secondary surface-3 26, and the secondary surface-4 27 are positioned such that the light beams reflected by the secondary surface-2 25 and the light beams reflected by the secondary surface-3 26 are substantially parallel.

The secondary surface-2 25 is a totally reflective surface that satisfies the total internal reflected condition for illuminating light incident from the secondary surface-1 23.

Needless to say, a reflective coating is not required on the primary surface-3 12 of the primary optical element 21.

The primary surface-1 10 through the primary surface-4 13, and the secondary surface-1 23 through the secondary surface-4 27, are positioned such that the beams of illuminating light reflected by the primary surface-2 11, and the beams of illuminating light reflected by the secondary surface-2 25 are substantially parallel Next, use, actions, and effects of the compound optical element 20 and the illuminating apparatus 18 according to the present embodiment will be explained, with reference to FIG. 7.

Firstly, the diffuse illuminating light from the light emitting part 5 is radiated with the perpendicular direction of the base 6 as the direction of illumination. The diffuse illuminating light incident on the primary surface-1 10 of the primary optical element 21 is radiated from the primary surface-4 13 by an action similar to in the first embodiment.

The illuminating light reflected by the primary surface-3 12 in the optical element 3 according to the first embodiment, in the present embodiment, is incident from the secondary surface-1 23 of the secondary optical element 22, and reaches the secondary surface-2 25, and since the secondary surface-2 25 is a parabolic surface, is reflected towards the secondary surface-4 27. At this time, since the secondary surface-2 25 is a totally reflective surface, the light is reflected without Fresnel loss. Hence the illuminating light incident on the secondary surface-1 23 is adjusted to be substantially parallel to the direction of illumination, and is radiated from the secondary surface-4 27.

Of the illuminating light not incident on the secondary surface-1 23, the illuminating light reaching the secondary surface-3 26 closer to the direction of illumination is reflected by the secondary surface-3 26. At this time, since the secondary surface-3 26 is a parabolic surface, the reflected light proceeds in a direction substantially parallel to the direction of illumination.

The illuminating light not reflected by the secondary surface-3 26 proceeds in the direction of illumination without change.

According to the compound optical element 20 and the illuminating apparatus 18 of the present embodiment, of the diffuse illuminating light, even if there is illuminating light having a component with a small angle of inclination from the direction of illumination, a reflective surface can be provided for this. Therefore, efficiency of condensing in the direction of illumination can be improved.

Figure 8:
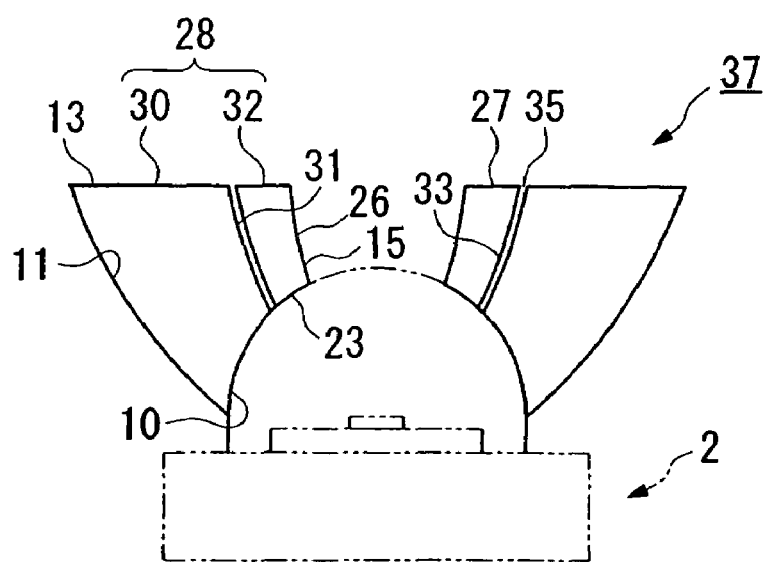
FIG. 8 is a side view of an illuminating apparatus and an optical element of a fourth embodiment of the present invention.
Figure 9:
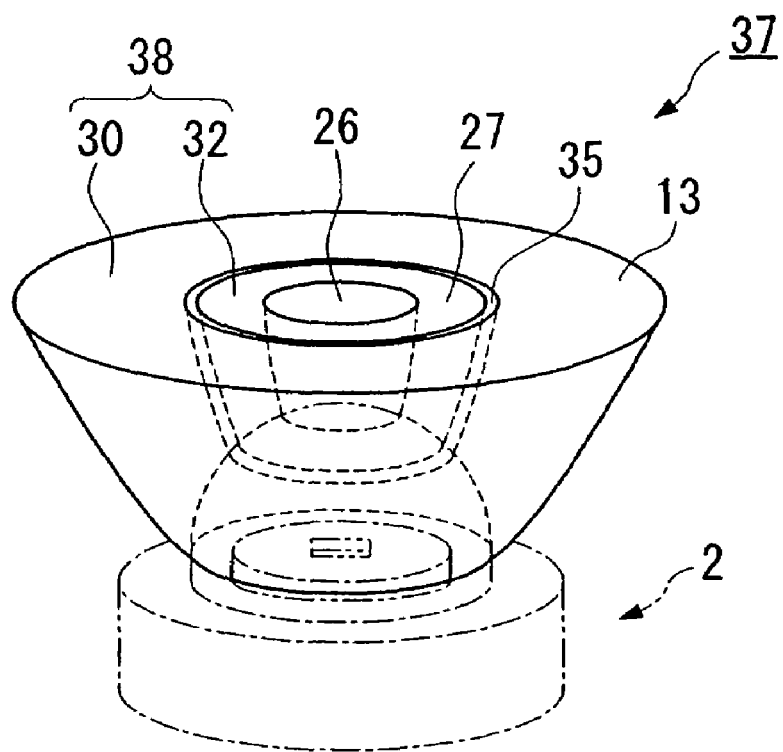
FIG. 9 is a perspective view of the same illuminating apparatus and optical element.

Next, a fourth embodiment of the present invention will be explained, with reference to FIGS. 8 and 9.

The same reference symbols are employed for components the same as in the first embodiment, and description is omitted.

The present embodiment differs from the third embodiment in that the compound optical element 28 according to the present embodiment is provided with an air layer 35 in a gap between the primary surface-3 31 in the primary optical element 30, and the secondary surface-2 33 in the secondary optical element 32. It is desirable that the gap width of this air layer 35 be small.

Differing from the third embodiment, in the present embodiment, the refractive index of the primary optical element 30 and the secondary optical element 32 may be substantially equal. The secondary surface-2 33 is a totally reflective surface that satisfies the total internal reflected condition for illuminating light incident from the secondary surface-1 23.

A reflective coating is not formed on the primary surface-3 31 in the primary optical element 30. A reflective coating 15 is applied to the secondary surface-3 26.

According to the compound optical element 28 and illuminating apparatus 37 of the present embodiment, since the illuminating light incident from the secondary surface-1 23 can be totally reflected by the secondary surface-2 33 in the secondary optical element 32, similar actions and effects as with the third embodiment can be obtained.

Next, a fifth embodiment of the present invention will be explained, with reference to FIG. 10.

The same reference symbols are employed for components the same as in the aforementioned other embodiments, and description is omitted.

Figure 10:
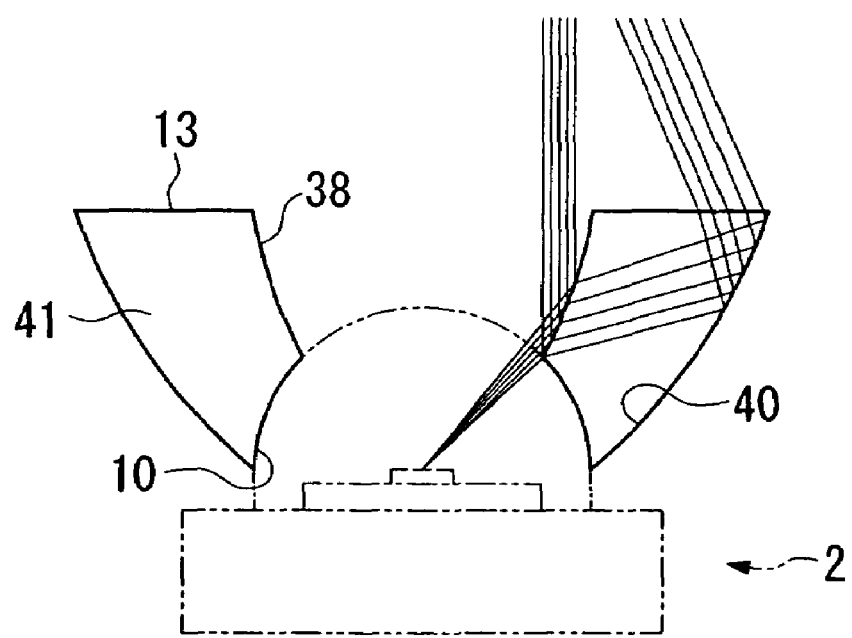
FIG. 10 is an optical path diagram of an illuminating light in an illuminating apparatus according to a fifth embodiment of the present invention.

As shown in FIG. 10, in the present embodiment an optical element 41 is provided wherein a primary surface-3 38 reflects diffuse illuminating light radiated by the light source device 2 by Fresnel reflection, and a primary surface-2 40 reflects illuminating light incident from primary surface-1 10 and illuminating light not Fresnel-reflected by the primary surface-3 38 and transmitted.

In this case, since the primary surface-2 40 satisfies the total internal reflected condition, even if part of the illuminating light is transmitted by Fresnel reflection due to a reflective coating not being formed on the primary surface-3 38, the light can be reflected by the primary surface-3 38, and as a result, can be radiated from the primary surface-4-13.

Figure 13:
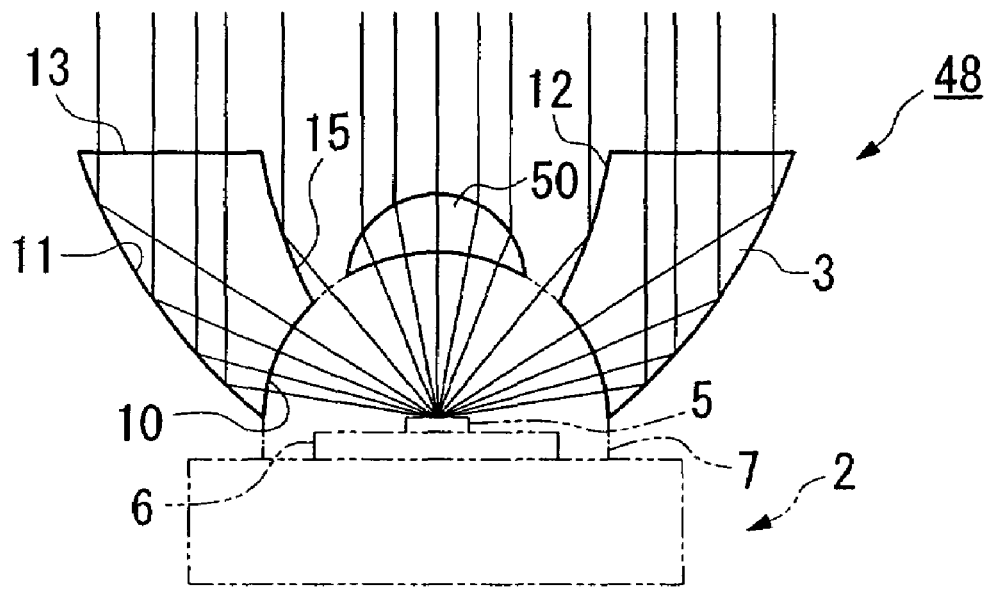
FIG. 13 is a side view of an illuminating apparatus and an optical element according to a sixth embodiment of the present invention.

Next, a sixth embodiment of the present invention will be explained, with reference to FIG. 13.

The same reference symbols are employed for components the same as in the aforementioned other embodiments, and description is omitted.

The present embodiment differs from the first embodiment in that an illuminating apparatus 48 according to the present embodiment is provided with a lens having a positive power. Moreover, this lens 50 is bonded to the molded lens 7 with transparent adhesive for use with optical devices.

According to the illuminating apparatus 48 of the present embodiment, by adding such a lens 50 to the illuminating apparatus 2, not only can the light from the optical element 3 be made parallel, but the component of the diffuse illuminating light having a small angle of inclination from the direction of illumination can also be made parallel.

The technical scope of the present invention is not limited to the embodiments, and various modifications may be added within a scope that does not depart from the gist of the present invention.

For example, the optical element, or the shape of the faces of the compound optical element, is not limited to a shape of a body of revolution around the central axis C, and may be variously deformed and modified as appropriate to the shape of the light source device and to the application.

Furthermore, the outside diameter of the primary surface-4 or the secondary surface-4 may be changed in accordance with, the limits of size when mounting on the light source device, and the application. In association with this, the inside diameter of the primary surface-4 or the secondary surface-4 may be changed by raising and lowering the line of intersection of the primary surface-1 or the secondary surface-1, and the primary surface-3 or the secondary surface-3.

Figure 11:
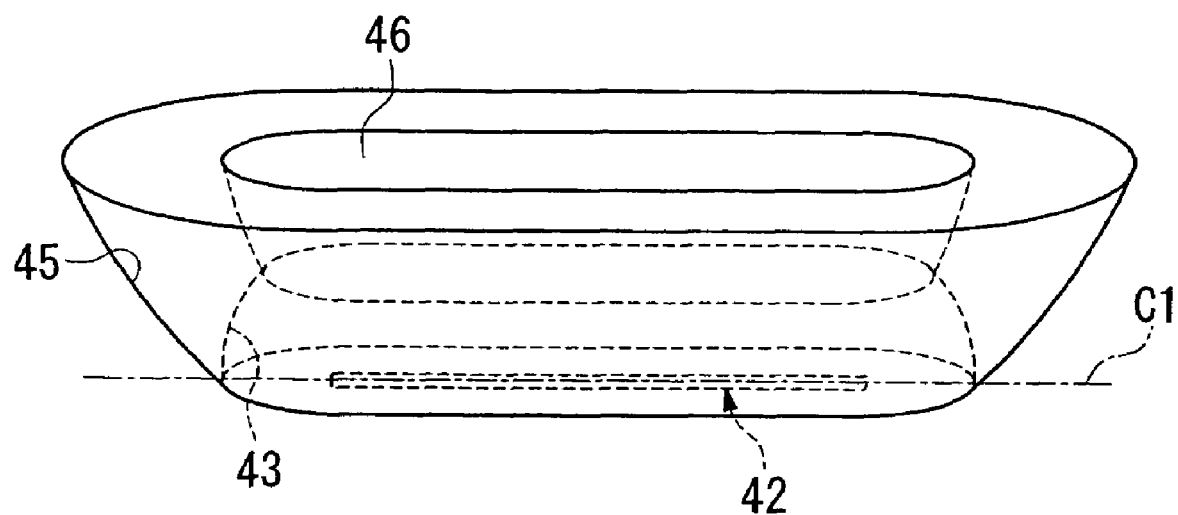
FIG. 11 is a perspective view of an illuminating apparatus and an optical element according to another embodiment of the present invention.

Moreover, when as shown in FIG. 11, the shape of the light source device 42 is elongated, the shape of the primary surface-1 43 whereon the light from the light source device 42 is incident may be changed to a shape permitting mounting on the light source device 42, and the primary surface-2 45 and the primary surface-3 46 may be extended along the major axis C1 of the light source device 42 while maintaining the respective convex and concave shapes.

Figure 12:
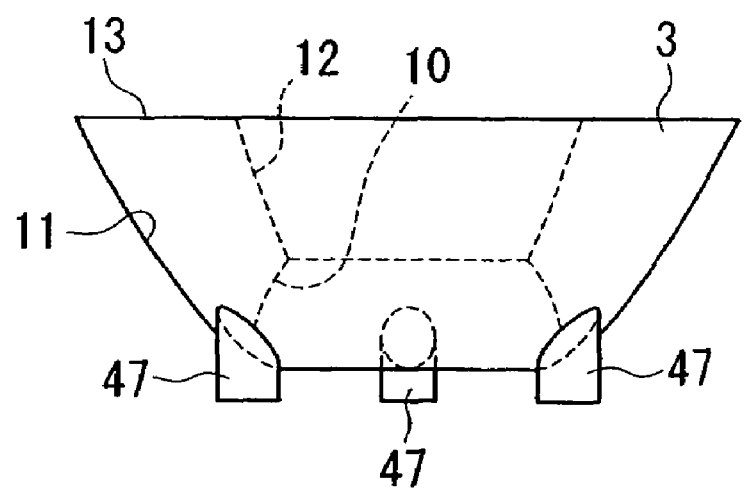
FIG. 12 is a side view of an illuminating apparatus and an optical element according to another embodiment of the present invention.

Furthermore, as shown in FIG. 12, when support columns 47 are provided on the optical element 3, it can be positioned accurately in relation to the light source device, and can be fixed firmly in place. Since the light source device can be fixed mainly with the primary surface-1 10, narrow columns at three points suffice for the support parts, and have little effect on reflection by the primary surface-1 10.

Figure 14:
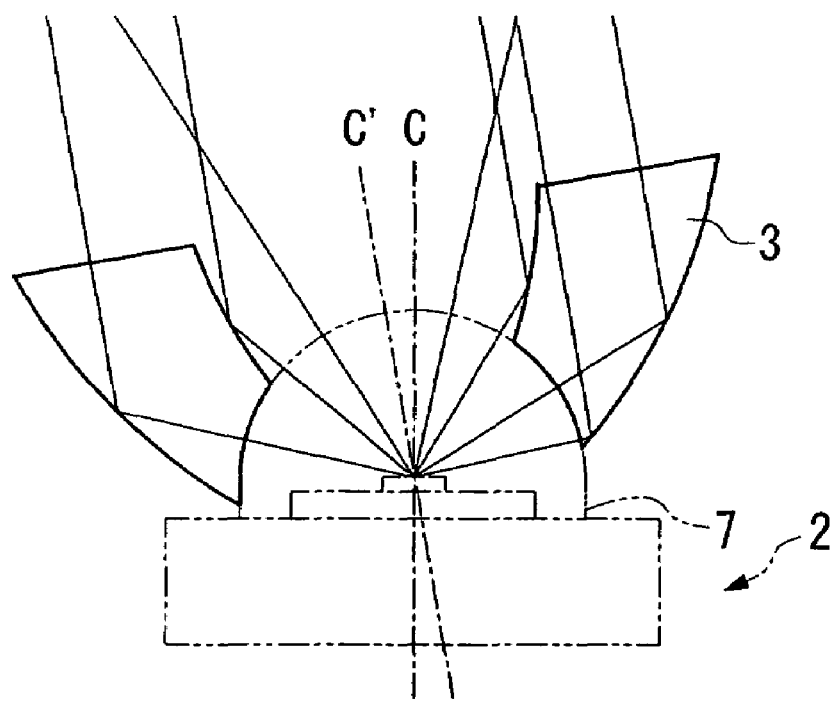
FIG. 14 is a side view of an illuminating apparatus and an optical element according to another embodiment of the present invention.

Moreover, as shown in FIG. 14, the direction of the central axis C of the distribution of light from the light source device, and the direction of illumination C', may mutually differ.

Preferred embodiments of the present invention have been described above, however, the present invention is not limited to these embodiments. Addition, omission, replacement of, and other modifications to, the configurations are possible within a scope that does not depart from the gist of the present invention. The present invention is not limited by the above description, and is only limited by the scope of the appended claims.

The optical element and compound optical element, and the illuminating apparatus, of the present invention described above are hereunder summarized.

The optical element according to the present invention is an optical element which is positioned in relation to the light source device, and which converts illuminating light radiated by the light source device into substantially parallel light, and is provided with at least: a primary surface-1 whereon the diffuse illuminating light radiated by the light source device is incident; a primary surface-2 formed in a concave cross-sectional shape when viewed from the primary surface-1, which reflects only the illuminating light radiated from the primary surface-1; a primary surface-3 formed in a convex cross-sectional shape when viewed from the primary surface-1, which reflects only the diffuse illuminating light radiated by the light source device; and a primary surface-4 which radiates illuminating light incident from the primary surface-1 and illuminating light reflected by the primary surface-2. These primary surfaces-1 through -4 are located at positions such that the light beams reflected by the primary surface-2, and the light beams reflected by the primary surface-3 are substantially parallel.

The illuminating apparatus according to the present invention is provided with a light source device which radiates diffuse illuminating light, and the optical element.

A reflective coating may be provided on the primary surface-3.

In the optical element or the illuminating apparatus, when diffuse illuminating light is radiated with the primary surface-1 positioned on the light source device side, the component of the diffuse illuminating light which is displaced from the desired illumination direction, is reflected by the primary surface-3, or is transmitted through the primary surface-1 and reflected by the primary surface-2, and thus radiated from the primary surface-4. Therefore, any light can be changed so that the light path faces the illumination direction, and the diffuse illuminating light can be arranged substantially parallel in the desired illumination direction to suit the illuminating light originally having a component with a small angle of inclination from the illumination direction.

The compound optical element according to the present invention is provided with the optical element being the primary optical element, and the secondary optical element positioned adjacent to the primary surface-3 of the primary optical element. The secondary optical element is provided with at least: a secondary surface-1 whereon the diffuse illuminating light radiated by the light source device is incident; a secondary surface-2 formed in a concave cross-sectional shape when viewed from the secondary surface-1, which reflects only the illuminating light incident from the secondary surface-1; a secondary surface-3 formed in a convex cross-sectional shape when viewed from the secondary surface-1, which reflects only the diffuse illuminating light radiated by the light source device; and a secondary surface-4 which radiates illuminating light incident from the secondary surface-1 and illuminating light reflected by the secondary surface-2. These secondary surfaces-1 through -4 are located at positions such that the light beams reflected by the secondary surface-2 and the light beams reflected by the secondary surface-3 are substantially parallel.

A reflective coating may be provided on the secondary surface-3.

Another illuminating apparatus according to the present invention is provided with a light source device which radiates diffuse illuminating light, and the compound optical element. The secondary optical element has a refractive index higher than the refractive index of the primary optical element, and is positioned such that the secondary surface-2 and the primary surface-3 are in contact.

The primary surfaces-1 through -4, and the secondary surfaces-1 through -4 may be positioned such that the light beams of the illuminating light reflected by the primary surface-2, and the light beams of the illuminating light reflected by the secondary surface-2 are substantially parallel.

In the compound optical element or the other light source device, part of the direct light transmitted through, or not reflected by, any surface of the primary optical element, and radiated directly towards the direction of illumination, can be transmitted through the secondary surface-1, reflected by the secondary surface-2, and furthermore, radiated from the secondary surface-4 to become transmitted light. Consequently, the efficiency of the condensing light can be improved in the direction of illumination of the diffuse illuminating light to suit the light reflected by the secondary surface-3, and the direct light from the light source transmitted through, or not reflected by, any surfaces.

The primary surface-2 may be a totally reflective surface that satisfies the total internal reflected condition for illuminating light incident from the primary surface-1.

In this case, the attenuation when the illuminating light transmitted through the primary surface-1 is reflected by the primary surface-2, can be suppressed.

The primary surface-3 may be provided with a reflective coating which reflects the diffuse illuminating light radiated by the light source device.

In this case, the component of the diffuse illuminating light not incident on the primary surface-1 can be reflected by the primary surface-3 in the direction of illumination, and the condensing efficiency can be improved.

The primary surface-2 and the primary surface-3 may be parabolic surfaces.

In this case, the positions of the respective focal points of the parabolic surface including the primary surface-2 and the parabolic surface including the primary surface-3 may be in substantially the same position.

In this case, the position of the focal points may be at the approximate center of the light source device.

In this illuminating apparatus, when the light source device is a point light source, the light can be readily changed to substantially parallel light by reflecting diffuse illuminating light onto the parabolic surface. In this case, by matching the position of the focal points, the condensing efficiency can be improved.

The light source device may be provided with a light emitting part, and a primary transparent element which covers this light emitting part, and a secondary transparent element may fill a gap between the primary surface-1 and the primary transparent element.

In this case, the refractive index of the secondary transparent element may be substantially equal to the refractive index of the optical element.

In this case, the secondary transparent element may be a transparent adhesive for use with optical devices, and between the optical element and the light source device may be bonded with the transparent adhesive for use with optical devices.

In this illuminating apparatus, the difference in refractive index across the gap can be reduced by filling the gap between the light source device and the optical element with the transparent element. Consequently, Fresnel loss when light is radiated from the transparent element which covers the light emitting part, and when light is incident on the optical element, can be reduced. Moreover, by fixing in place with the transparent adhesive for use with optical devices, the optical element can be held directly on the light source device.

The secondary surface-2 may be a totally reflective surface that satisfies the total internal reflected condition for illuminating light incident from the secondary surface-1.

In this case, the attenuation when the illuminating light transmitted through the secondary surface-1 is reflected by the secondary surface-2, can be suppressed.

Another illuminating apparatus according to the present invention is provided with a light source device which radiates diffuse illuminating light, and the compound optical element. The secondary surface-2 and the primary surface-3 are spatially separated by a gap.

The gap may be an air layer, and the secondary surface-2 may be a totally reflective surface that satisfies the total internal reflected condition for illuminating light incident from the secondary surface-1.

A reflective coating which reflects the diffuse illuminating light radiated by the light source device may be provided on the secondary surface-3.

The primary surfaces-1 through -4, and the secondary surfaces-1 through -4 may be positioned such that the beams of illuminating light reflected by the primary surface-2, and the beams of illuminating light reflected by the secondary surface-2 are substantially parallel.

In this illuminating apparatus, even when the refractive indices of the primary optical element and the secondary optical element are equal, light from the light source device can be totally reflected by the secondary surface-2 of the secondary optical element. Consequently, a reflecting surface can also be provided for part of the light radiated directly from the light source device in the direction of illumination. Therefore, condensing efficiency can be increased.

Furthermore, similarly to the relationship of the secondary optical element to the primary optical element, additionally, a ternary or more optical element can be located on the inside of the secondary optical element, and condensing efficiency can be further increased.

Moreover, another illuminating apparatus according to the present invention includes: a light source device having a light emitting part and a transparent element which covers the light emitting part, which radiates diffuse illuminating light; the abovementioned optical element; and a lens having a positive power and positioned on the surface of the transparent element not in contact with the optical element.

The lens may be of a shape having optical characteristics such that the beams of illuminating light passing through the lens are substantially parallel to the beams of illuminating light reflected by the primary surface-2, or the beams of illuminating light reflected by the secondary surface-2.

In this case, the efficiency of condensing light can be further improved by transmitting illuminating light through a lens having a positive power.

Another illuminating apparatus according to the present invention has a light source device which radiates diffuse illuminating light, and an optical element which converts the diffuse illuminating light radiated by the light source device into substantially parallel light, and the optical element is provided with at least: a primary surface whereon the diffuse illuminating light radiated by the light source device is incident; a ternary surface formed in a convex cross-sectional shape when viewed from the primary surface, which reflects the diffuse illuminating light radiated by the light source device by Fresnel reflection; a secondary surface formed in a concave cross-sectional shape when viewed from the primary surface, which reflects illuminating light incident from the primary surface and illuminating light transmitted without Fresnel reflection by the ternary surface; and a quaternary surface which radiates illuminating light incident from the primary surface and illuminating light reflected by the secondary surface. These primary through quaternary surfaces are located at positions such that the light beams reflected by the secondary surface and the light beams reflected by the ternary surface are substantially parallel, or are located at positions such that they are inclined towards the light source device from the substantially parallel direction.

In this illuminating apparatus, even with transmitted light transmitted through the ternary surface, since the light can be reflected by the secondary surface and radiated from the quaternary surface, the efficiency of condensing light can be improved in the desired direction of illumination.

As described above, according to the present invention, an optical element and a compound optical element which can condense the diffuse illuminating light from a light source device efficiently in the desired direction of illumination, and a comparatively readily manufactured and held illuminating apparatus, can be provided.

What is claimed is:

1. An optical element, which is positioned in relation to a light source device, to convert the diffuse illumination light radiated by the light source device into substantially parallel light, comprising:

a primary surface-1 whereon the diffuse illuminating light radiated by the light source device is incident;

a primary surface-2 formed in a concave cross-sectional shape when viewed from the primary surface-1, which reflects only illuminating light incident from the primary surface-1;

a primary surface-3 formed in a convex cross-sectional shape when viewed from the primary surface-2, which reflects only diffuse illuminating light radiated by the light source device; and a primary surface-4 which radiates illuminating light incident from the primary surface-1 and illuminating light reflected by the primary surface-2, wherein the primary surfaces-1 through -4 are located at positions such that light beams reflected by the primary surface-2 and light beams reflected by the primary surface-3 are substantially parallel.

2. The optical element, according to claim 1, wherein the primary surface-3 comprises a reflective coating.

3. A compound optical element, comprising the optical element according to claim 1, which is the primary optical element, and a secondary optical element positioned adjacent to the primary surface-3 of the primary optical element, wherein the secondary optical element comprises at least:

a secondary surface-1 whereon the diffuse illuminating light radiated by the light source device is incident;

a secondary surface-2 formed in a concave cross-sectional shape when viewed from the secondary surface-1, which reflects only illuminating light incident from the secondary surface-1;

a secondary surface-3 formed in a convex cross-sectional shape when viewed from the secondary surface-1, which reflects only diffuse illuminating light radiated by the light source device; and a secondary surface-4 which radiates illuminating light incident from the secondary surface-1 and illuminating light reflected by the secondary surface-2, and wherein the secondary surfaces-1 through -4 are located at positions such that light beams reflected by the secondary surface-2 and light beams reflected by the secondary surface-3 are substantially parallel.

4. The compound optical element, according to claim 3, wherein the secondary surface-3 comprises a reflective coating.

5. An illuminating apparatus, comprising a light source device which radiates diffuse illuminating light, and the compound optical element according to claim 3, wherein the secondary optical element has a refractive index higher than a refractive index of the primary optical element, and is positioned such that the secondary surface-2 and the primary surface-3 are in contact.

6. The illuminating apparatus, according to claim 5, wherein the secondary surface-2 is a totally reflective surface that satisfies a total internal reflected condition for illuminating light incident from the secondary surface-1.

7. The illuminating apparatus, according to claim 6, wherein the primary surfaces-1 through -4, and the secondary surfaces-1 through -4 are positioned such that the beams of illuminating light reflected by the primary surface-2, and the beams of illuminating light reflected by the secondary surface-2 are substantially parallel.

8. The illuminating apparatus, according to claim 5, wherein a reflective coating which reflects the diffuse illuminating light radiated by the light source device is provided on the secondary surface-3.

9. The illuminating apparatus, according to claim 5, wherein:

the light source device comprises a light emitting part, and a primary transparent element which covers the light emitting part; and a secondary transparent element is provided in a gap between the primary surface-1 and the primary transparent element.

10. An illuminating apparatus, comprising a light source device which radiates diffuse illuminating light, and the compound optical element according to claim 3, wherein the secondary surface-2 and the primary surface-3 are adjacent via a spatial gap.

11. The illuminating apparatus, according to claim 10, wherein:

the spatial gap is an air layer; and the secondary surface-2 is a totally reflective surface that satisfies a total internal reflected condition for illuminating light incident from the secondary surface-1.

12. The illuminating apparatus, according to claim 11, wherein the primary surfaces- through -4, and the secondary surfaces-1 through -4 are positioned such that beams of illuminating light reflected by the primary surface-2, and beams of illuminating light reflected by the secondary surface-2 are substantially parallel.

13. The illuminating apparatus, according to claim 10, wherein a reflective coating which reflects the diffuse illuminating light radiated by the light source device is provided on the secondary surface-3.

14. The illuminating apparatus, according to claim 10, wherein:

the light source device comprises a light emitting part, and a primary transparent element which covers the light emitting part; and a secondary transparent element is provided in a gap between the primary surface-1 and the primary transparent element.

15. An illuminating apparatus, comprising a light source device which radiates diffuse illuminating light, and the optical element according to claim 1.

16. The illuminating apparatus, according to claim 15, wherein the primary surface-2 is a totally reflective surface which satisfies a total internal reflected condition for illuminating light incident from the primary surface-1.

17. The illuminating apparatus, according to claim 15, wherein the primary surface-3 comprises a reflective coating which reflects the diffuse illuminating light radiated by the light source device.

18. The illuminating apparatus, according to claim 15, wherein the primary surface-2 and the primary surface-3 are parabolic surfaces.

19. The illuminating apparatus, according to claim 18, wherein a position of a focal point of a parabolic surface forming the primary surface-2, and a position of a focal point of a parabolic surface forming the primary surface-3 are in substantially the same position.

20. The illuminating apparatus, according to claim 19, wherein the position of the focal points is located at an approximate center of the light source device.

21. The illuminating apparatus, according to claim 15, wherein:

the light source device comprises a light emitting part, and a primary transparent element which covers the light emitting part; and a secondary transparent element is provided in a gap between the primary surface-1 and the primary transparent element.

22. The illuminating apparatus, according to claim 21, wherein
a refractive index of the secondary transparent element is substantially equal to a refractive index of said optical element.

23. The illuminating apparatus, according to claim 21, wherein:
the secondary transparent element is a transparent adhesive for use with optical devices which is applied;
between said optical element, and the light source device.

24. An illuminating apparatus, comprising:
a light source device having a light emitting part and a transparent element which covers the light emitting part, which radiates diffuse illuminating light;
the optical element according to claim 1; and
a lens having a positive power and positioned on a surface of the transparent element not in contact with the optical element.

25. The illuminating apparatus, according to claim 24, wherein
the lens comprises a shape having optical characteristics such that beams of illuminating light passing through the lens are substantially parallel to beams of illuminating light reflected by the primary surface-2 or the beams of illuminating light reflected by the secondary surface-2.

26. The optical element, according to claim 1, wherein the primary surface-1 includes an opening formed in a center portion thereof through which the diffuse illuminating light radiated by the light source device passes when the primary surface-1 is viewed from the light source device.

27. An illuminating apparatus, comprising a light source device which radiates diffuse illuminating light, and an optical element which converts diffuse illuminating light radiated by the light source device into substantially parallel light, wherein
the optical element comprises at least:
a primary surface whereon the diffuse illuminating light radiated by the light source device is incident;
a ternary surface formed in a convex cross-sectional shape when viewed from a secondary surface, which reflects the diffuse illuminating light radiated by the light source device by Fresnel reflection;
the secondary surface formed in a concave cross-sectional shape when viewed from the primary surface, which reflects illuminating light incident from the primary surface and illuminating light transmitted without Fresnel reflection by the ternary surface; and
a quaternary surface which radiates illuminating light incident from the primary surface and illuminating light reflected by the secondary surface, and wherein
the primary through quaternary surfaces are located at positions such that light beams reflected by the secondary surface and light beams reflected by the ternary surface are substantially parallel, or at positions such that they are inclined towards the light source device from a substantially parallel direction.

28. The illuminating apparatus, according to claim 27, wherein the primary surface includes an opening formed in a center portion thereof through which the diffuse illuminating light radiated by the light source device passes when the primary surface is viewed from the light source device.

* * * * *

UNITED STATES PATENT AND TRADEMARK OFFICE
CERTIFICATE OF CORRECTION

| | |
|---|---|
| PATENT NO. | : 7,431,480 B2 |
| APPLICATION NO. | : 11/015626 |
| DATED | : October 7, 2008 |
| INVENTOR(S) | : Godo |

Page 1 of 1

It is certified that error appears in the above-identified patent and that said Letters Patent is hereby corrected as shown below:

In claim 12, column 14, line 22, insert --1-- after "the primary surfaces-" to read "the primary surfaces-1".

Signed and Sealed this

Twenty-sixth Day of May, 2009

JOHN DOLL
*Acting Director of the United States Patent and Trademark Office*